UNITED STATES PATENT OFFICE.

JACOB G. LIPMAN, OF NEW BRUNSWICK, NEW JERSEY.

PROCESS FOR PRODUCING CITRATE SOLUBLE PHOSPHATES.

1,222,112.     Specification of Letters Patent.     Patented Apr. 10, 1917.

No Drawing.     Application filed February 17, 1916. Serial No. 78,841.

*To all whom it may concern:*

Be it known that I, JACOB G. LIPMAN, a citizen of the United States, residing at New Brunswick, in the county of Middlesex and State of New Jersey, have invented certain new and useful Improvements in Processes for Producing Citrate Soluble Phosphates, of which the following is a full, clear, and exact description.

This invention relates to certain new and useful improvements in processes for converting phosphate rock into a citrate soluble phosphate in which form the phosphate is designated as available and suitable for use as a fertilizer.

It has been customary to treat the natural phosphate with sulfuric acid to form a citrate soluble phosphate.

With the increasing cost of sulfuric acid the cost of citrate soluble phosphate has greatly increased. With my improved process the citrate soluble phosphate may be made directly from raw materials which are available everywhere at reasonable prices, namely, ground phosphate rock and ground sulfur. The process can be carried out by those unskilled in chemical manufacturing. In fact it is possible for farmers and others to produce phosphoric acid or citrate soluble phosphate themselves for their own use and to do so at the minimum of cost.

In my improved process I utilize the bacterial action of the soil to oxidize finely divided sulfur. As the sulfur is oxidized it combines with ground phosphate rock to form citrate soluble phosphates. It has been found that the bacterial process takes place more rapidly in a fertile soil than a poor soil, therefore it is preferable to have the soil as rich as possible to hasten the action.

I have found that the following mixture gives satisfactory results:

Finely ground phosphate rock_____ 10 parts.
Finely ground sulfur_____ 1 to 4 "
Fertile soil_____ 5 to 20 "
Well rotted manure_____ 5 to 10 "

The above ingredients should be thoroughly mixed and kept moist in the manner employed for ordinary farm compost. Water should be added when there is a tendency for the material to dry out. Excessive quantities of water should be avoided so that the material is not kept saturated with moisture.

If desired the proportions of soil and manure may be increased or decreased over the quantities given, but it is preferable that the sulfur and phosphate rock be maintained in about the proportions indicated. The bacterial efficiency or activity in the mixture develops gradually, reaching a maximum after three weeks' time. For this reason it is desirable, when starting a new mixture, to add to the new mixture a considerable quantity of old bacterially active mixture. The old mixture acts as an accelerator and hastens the oxidation of the sulfur in the new mixture.

I also contemplate the using of this process for making available potash which is found in feldspar rock, green sand marl and other material containing considerable quantities of silicates of potash. The sulfuric acid formed in the oxidation of the sulfur decomposes to a certain extent the insoluble potash compounds and transforms them into potassium sulfate which is freely soluble.

It will be understood that the apparatus and method of carrying out my improved process may be varied in different ways as will occur to those skilled in the art. What I claim as my invention is particularly pointed out in the appended claims.

I claim:

1. The herein described process for making citrate soluble phosphates from phosphate rock which consists in mixing finely divided sulfur, phosphate rock and fertile soil and oxidizing the sulfur by bacterial action to combine with the phosphate rock and form citrate soluble phosphates.

2. The herein described process for making citrate soluble phosphates from phosphate rock, which consists in mixing finely ground sulfur, ground phosphate rock, fertile soil and manure and oxidizing the sulfur by the bacterial action of the soil to a form adapted to combine with the phosphate rock and thereby form citrate soluble phosphates.

3. The herein described process for making citrate soluble phosphate which consists in mixing ground phosphate rock, ground sulfur, fertile soil and rotted manure, adding water to the mixture in suitable amounts to keep the mixture moist, oxidizing the sulfur by the bacterial action of the soil and thereby setting free acids, which are adapted to combine with the phosphate rock and form citrate soluble phosphate.

4. The herein described process for making citrate soluble phosphate from phosphate rock, which consists in mixing 10 parts of finely ground phosphate rock, one to four parts of finely ground sulfur, five to twenty parts of fertile soil and five to ten parts of well rotted manure, then adding water to moisten the mixture, and oxidizing the sulfur by bacterial action to a form adapted to combine with the phosphate rock to form citrate soluble phosphate.

5. The herein described process for making citrate soluble phosphates which consists in mixing finely ground sulfur, finely ground phosphate rock, fertile soil and manure, mixing the above mixture with a bacterially active mixture and thereby oxidizing the sulfur to an acid to combine with the phosphate rock and form citrate soluble phosphate.

In testimony whereof I affix my signature in the presence of two subscribing witnesses.

JACOB G. LIPMAN.

Witnesses:
  ANNETTE V. MARTIN,
  HARRIET E. GOWEN.